United States Patent
Parks et al.

(10) Patent No.: US 7,695,014 B2
(45) Date of Patent: Apr. 13, 2010

(54) OCCUPANT RESTRAINT SYSTEM

(75) Inventors: Brent Parks, Englewood, CO (US);
David Green, Brigham City, UT (US);
Mark Enders, Pleasant View, UT (US)

(73) Assignee: Autoliv ASP, Inc., Ogden, UT (US)

( * ) Notice: Subject to any disclaimer, the term of this patent is extended or adjusted under 35 U.S.C. 154(b) by 463 days.

(21) Appl. No.: 11/679,439

(22) Filed: Feb. 27, 2007

(65) Prior Publication Data
US 2008/0203716 A1    Aug. 28, 2008

(51) Int. Cl.
*B60R 21/23* (2006.01)
(52) U.S. Cl. .................................. 280/743.2
(58) Field of Classification Search .............. 280/743.2, 280/743.1, 732, 742
See application file for complete search history.

(56) References Cited

U.S. PATENT DOCUMENTS

| | | | |
|---|---|---|---|
| 5,887,894 A * | 3/1999 | Castagner et al. | 280/743.2 |
| 6,390,501 B1 | 5/2002 | Greib et al. | |
| 6,392,384 B1 | 5/2002 | Hwang Bo et al. | |
| 6,422,597 B1 | 7/2002 | Pinsenschaum et al. | |
| 6,425,603 B1 | 7/2002 | Eschbach | |
| 6,454,300 B1 | 9/2002 | Dunkle et al. | |
| 6,561,545 B2 | 5/2003 | Greib et al. | |
| 6,616,184 B2 | 9/2003 | Fischer | |
| 6,886,889 B2 | 5/2005 | Vits et al. | |
| 6,918,614 B2 | 7/2005 | Ryan | |
| 7,017,945 B2 | 3/2006 | DePottey et al. | |
| 7,021,657 B2 | 4/2006 | Kassman et al. | |
| 7,100,483 B2 | 9/2006 | Gass et al. | |
| 7,249,783 B2 * | 7/2007 | Parkinson et al. | 280/743.2 |
| 7,261,320 B2 * | 8/2007 | Fredin et al. | 280/743.2 |
| 7,448,646 B2 * | 11/2008 | Hall et al. | 280/739 |
| 7,530,596 B2 * | 5/2009 | Bito | 280/739 |
| 2002/0117840 A1 * | 8/2002 | Dunkle et al. | 280/743.2 |
| 2004/0232676 A1 | 11/2004 | Qvint et al. | |
| 2005/0212273 A1 | 9/2005 | Thomas et al. | |
| 2006/0170202 A1 | 8/2006 | Block et al. | |
| 2006/0214398 A1 * | 9/2006 | Fredin et al. | 280/728.2 |

(Continued)

FOREIGN PATENT DOCUMENTS

DE    103 46 525 A1    5/2005

(Continued)

OTHER PUBLICATIONS

International Search Report for PCT/US2008/002501; Mailing Date Apr. 7, 2008; 4 Pages.

*Primary Examiner*—Ruth Ilan
*Assistant Examiner*—Drew Brown
(74) *Attorney, Agent, or Firm*—Sally J Brown; Harness Dickey & Pierce PLC

(57) ABSTRACT

A tether release mechanism for a restraining element of a restraint protection system includes a base, a retention device and an actuator. The retention device is coupled to the base for movement between a locked position and a release position. The restraining element is secured relative to the base in the locked position and is movable relative to the base in the release position. The retention device includes a portion for releasably engaging the restraining element. The actuator is operatively associated with the retention device and is operative for at least initiating movement of the retention device from the locked position to the release position.

22 Claims, 9 Drawing Sheets

U.S. PATENT DOCUMENTS

| | | | |
|---|---|---|---|
| 2006/0214406 A1* | 9/2006 | Parkinson et al. | 280/743.2 |
| 2007/0024033 A1* | 2/2007 | Suzuki et al. | 280/730.2 |
| 2009/0039629 A1* | 2/2009 | Hall et al. | 280/739 |

FOREIGN PATENT DOCUMENTS

| | | |
|---|---|---|
| GB | 2 299 550 A | 10/1996 |
| GB | 2 415 665 A | 1/2006 |
| WO | 99/58389 A | 11/1999 |
| WO | 2006/102432 A | 9/2006 |

* cited by examiner

OCCUPANT RESTRAINT SYSTEM

FIELD

The present disclosure generally relates to occupant restraint systems for motor vehicles. More particularly, the present disclosure relates to an occupant restraint system including a release mechanism for selectively restraining an element of such a system in response to a predetermined condition.

INTRODUCTION

The statements in this section merely provide background information related to the present disclosure and may not constitute prior art.

Various systems are known for the restraint and protection of motor vehicle occupants. When a vehicle decelerates due to a collision, known occupant restraint systems operate to restrain the vehicle occupants with belts and/or airbags. For example, an inflatable restraint system may deploy an airbag to prevent contact between the occupant and the interior of the vehicle.

In order to provide an additional degree of freedom in the control of airbag performance, it has been suggested to utilize airbags with internal tethers. Such internal tethers may be used to modify a deployment characteristic of the airbag. In this regard, the internal tethers may restrict a deployed size or shape of an associated airbag. For purposes of selectively employing a tether in response to vehicle and/or passenger conditions, a suitable mechanism for releasing the tether is required.

SUMMARY

According to one aspect, the present teachings provide a release mechanism for a restraining element of an occupant restraint system. The release mechanism includes a base, a retention device and an actuator. The retention device is coupled to the base for movement between a locked position and a release position. The restraining element is secured relative to the base in the locked position and is movable relative to the base in the release position. The retention device includes a portion for releasably engaging the restraining element. The actuator is operatively associated with the retention device and is operative for at least initiating movement of the retention device from the locked position to the release position.

According to another aspect, the present teachings provide a release mechanism for a tether of an inflatable restraint device. The release mechanism includes a base, a retention device and an actuator. The retention device is coupled to the base for movement between a locked position and a release position. The tether is secured relative to the base in the locked position and is movable relative to the base in the release position. The retention device includes a portion for at least partially passing through a loop of the tether. The actuator is operatively associated with the retention device and is operative for at least initiating movement of the retention device from the locked position to the release position.

According to yet another aspect, the present teachings provide an airbag module. The airbag module includes an airbag for restraining motion of a vehicle occupant. A tether is associated with the airbag and is selectively operable to modify a deployment characteristic of the airbag. A release mechanism operates to selectively release the tether. The release mechanism includes a base, a retention device and an actuator. The retention device is coupled to base for movement between a locked position and a release position. The tether is secured relative to the base in the locked position and is movable relative to the base in the release position. The retention device includes a portion for releasable engaging the tether. An actuator is operatively associated with the retention device. The actuator is operative for at least initiating movement of the retention device from the locked position to the release position.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DESCRIPTION OF VARIOUS ASPECTS

Figure 1:
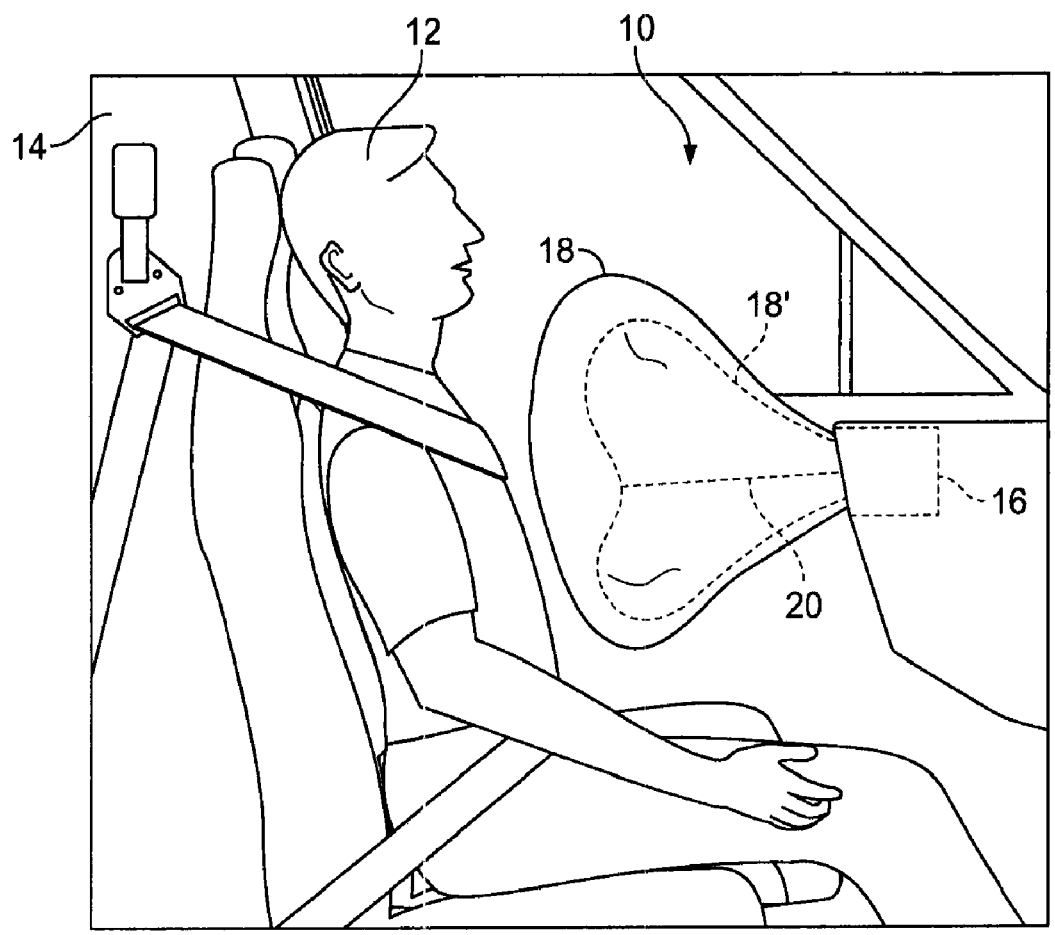
FIG. 1 is a side view of an occupant exemplary restraint system in accordance with the present teachings operatively associated with a vehicle having an occupant, the exemplary restraint system illustrated to include an airbag module.

The following description is merely exemplary in nature and is not intended to limit the present disclosure, application, or uses. It should be understood that throughout the drawings, corresponding reference numerals indicate like or corresponding parts and features. The description and any specific examples, while indicating embodiments of the present disclosure, are intended for purposes of illustration only and are not intended to limit the scope of the present disclosure. Moreover, recitation of multiple embodiments having stated features is not intended to exclude other embodiments having additional features, or other embodiments incorporating different combinations of the stated features.

Figure 1A:
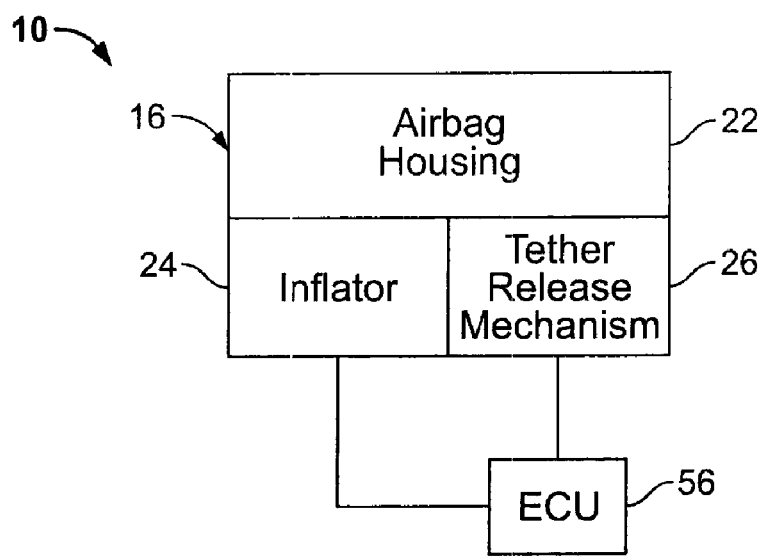
FIG. 1A is a simplified schematic view of the occupant restraint system of FIG. 1.
Figure 2:
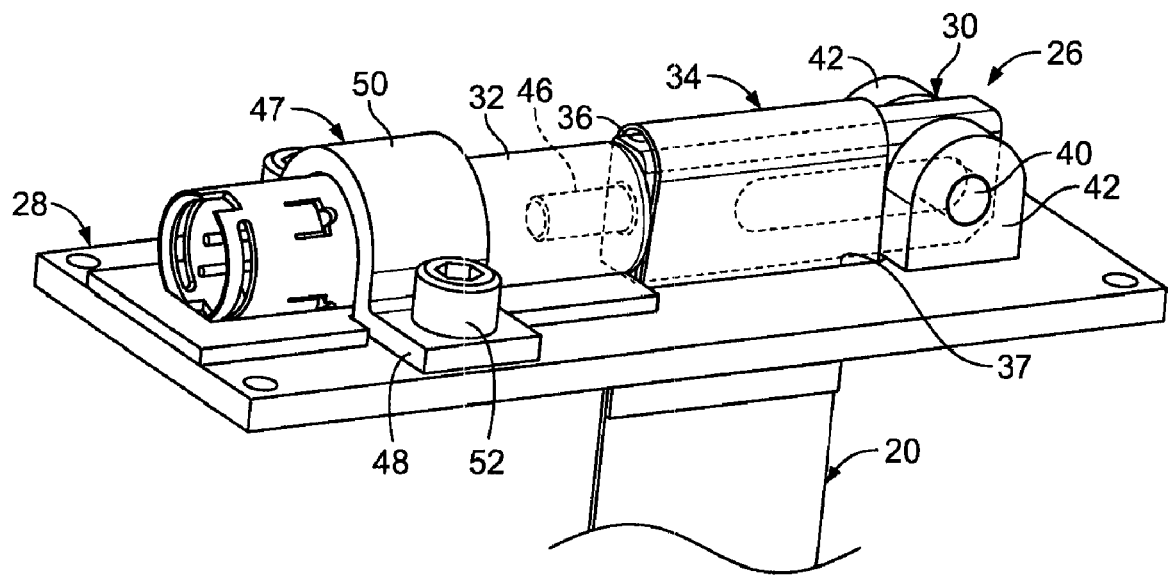
FIG. 2 is a perspective view of a tether release mechanism of the airbag module of the present teachings, the tether release mechanism shown retaining a tether of the occupant restraint system.
Figure 3:
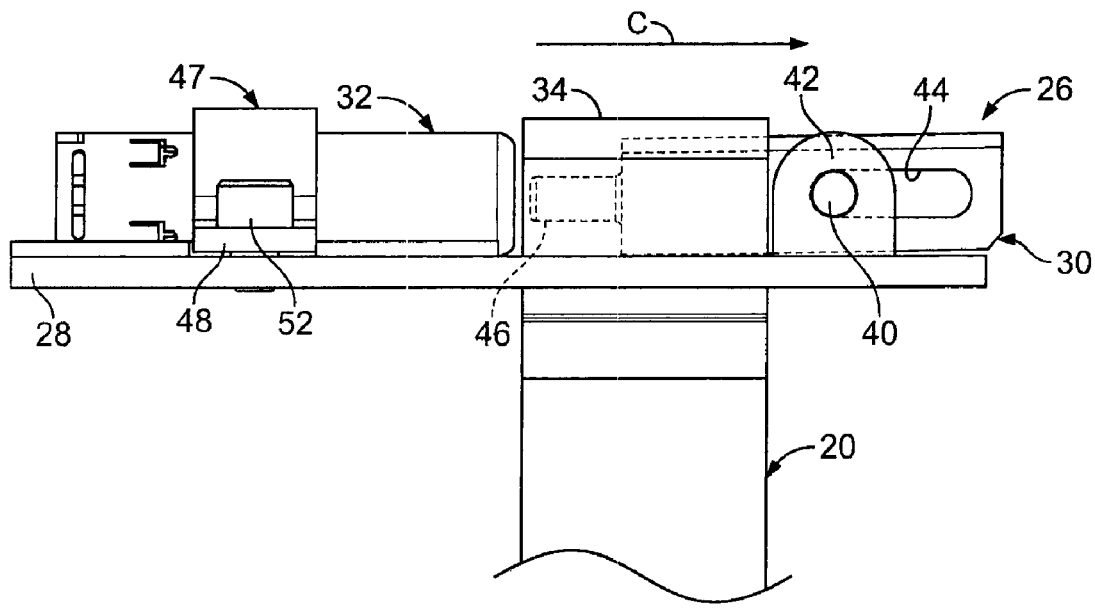
FIG. 3 is a side view of the tether release mechanism of FIG. 2, the tether release mechanism shown upon actuation of an actuator to linearly displace a tether retention device.
Figure 4:
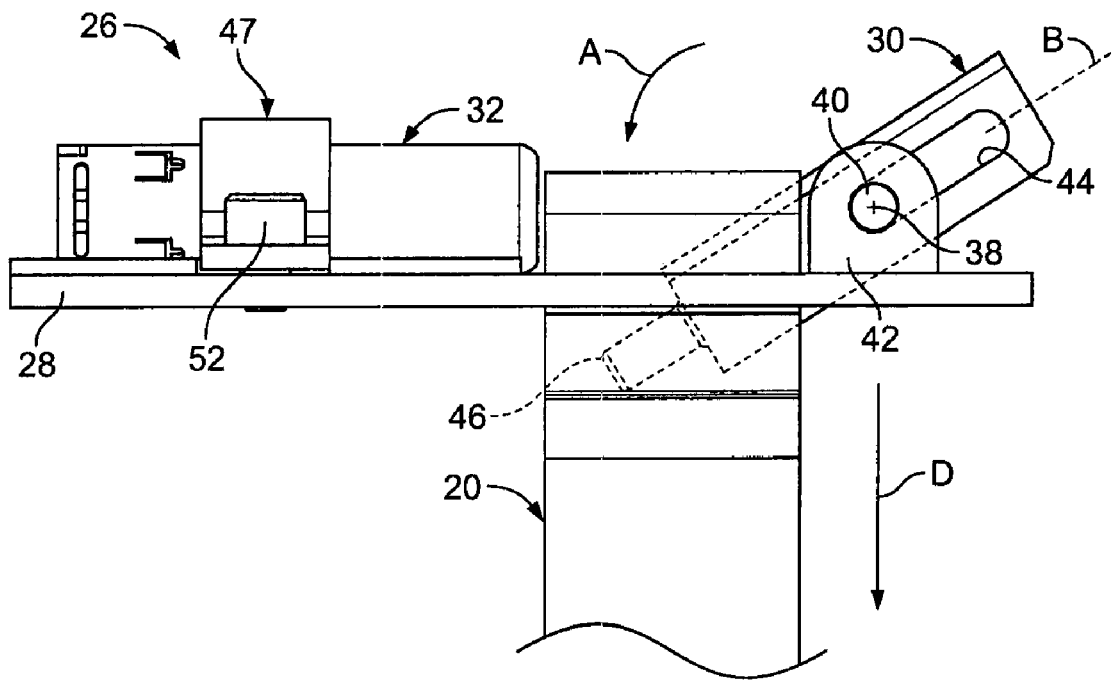
FIG. 4 is a side view similar to FIG. 3 of the tether release mechanism, the tether retention device shown partially rotated from the position of FIG. 3.
Figure 5:
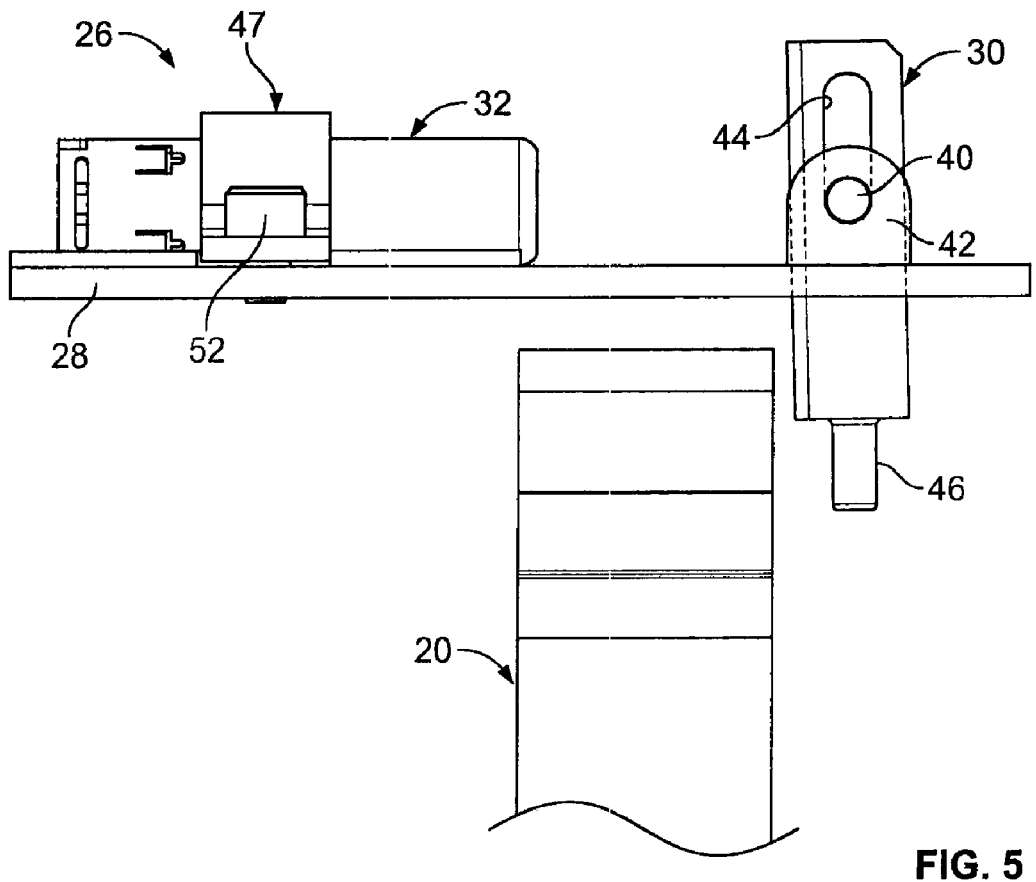
FIG. 5 is another side view of the tether release mechanism, the tether retention device shown further rotated from the position of FIG. 4 and the tether shown displaced from the tether release mechanism.

With initial reference to FIGS. 1 and 1A, an occupant restraint system in accordance with the present teachings is illustrated and generally identified at reference character 10. The occupant restraint system may be an inflatable restraint system 10 for protecting an occupant 12 of a motor vehicle 14 including an airbag module 16 having an airbag 18. The airbag module 16 is shown particularly for passenger side use. It will be appreciated, however, the certain teachings of the present disclosure are equally applicable for driver side applications.

The airbag 18 may be associated with a restraining element such as a tether 20 for modifying a deployment characteristic of the airbag 18. In other applications, the restraining element 20 may be a strap, webbing, safety belt, flexible member or the like. In a conventional manner, the tether 20 may be secured at one or more points to the inside of the airbag 18. In a manner to be more fully addressed below, the system 10 may utilize the tether 20 to selectively modify a deployment characteristic of the airbag 18 in response to one or more predetermined conditions. The tether 20 may modify the size and/or shape of the airbag 18 for appropriate usage. For example, the tether 20 may be employed to effectively reduce the size and shape of the airbag, as shown at reference character 18'.

In addition to the airbag 18, the airbag module 16 may generally include an airbag housing 22, an inflator 24 for delivering a source of inflation gas to the airbag 18, and a tether release mechanism 26. To the extent not described herein, it will be understood that the airbag 18, airbag housing 22 and inflator 24 may be conventional in construction and operation.

With continued reference to FIGS. 1 and 1A and additional reference to FIGS. 2 through 5, the release mechanism 26 will be further described. The release mechanism 26 may generally include a base 28, a retention device 30 and an actuator 32. The base 28 may be a plate forming a portion of the airbag housing 22 or suitably attached to the airbag housing 22.

The retention device 30 is carried by the base 28 and may normally engage the tether 20 for coupling of the tether 20 to the base 28. The tether 20 may have a looped end 34 defining an opening 36. The loop of the end 34 may be stitched into the tether 20. A portion of the retention device 30 may be received within the opening 36.

The retention device 30 may be coupled to the base 28 for movement between a locked position and a release position. As illustrated, the retention device 30 may be coupled to the base 28 for pivotal movement in the direction of arrow A about a pivot axis 38 and translation along an axis B generally defined by the longitudinal axis of the retention device 30. In the locked position (shown in FIG. 2, for example), the tether 20 is secured relative to the base 28 and passes through an opening 37 in the base 28. In the release position (shown in FIG. 5, for example), the tether 20 is moveable relative to the base 28.

The retention device 30 may be coupled to the plate 28 by a pin 40. The pin 40 may be carried by a pair of upwardly extending mounting portions 42. The pin 40 may extend between the mounting portions 42 and pass through an elongated slot 44 defined by the retention device 30.

In the locked position, a reduced diameter end 46 of the retention device 30 is received by the actuator 32. In this manner, engagement with the actuator 32 precludes rotation of the retention device 30. The actuator 32 may also prevent linear translation of the retention device 30 while the retention device is in the locked position.

The actuator 32 is operative for at least initiating movement of the retention device 30 from the locked position to the release position. In this regard, it will be understood that the actuator 32 may simply prevent movement of the retention device 30 from the locked position to the release position against tension applied through the tether 20 in response to inflation of the airbag 18. The actuator 32 may be an initiator, electromagnetic spring, solenoid or the like.

As illustrated, the actuator 32 may be a pyrotechnic actuator that is self-contained and does not release any combustion by-products. The actuator 32 includes a housing 45 and defines an opening for receiving the end 46 of the retention device 30. The actuator 32 may further include an initiator cup. The initiator cup may be generally extendable from a first length to a second length upon reaction initiation of a reactive charge carried by the actuator 32. Explaining further, upon reaction initiation of the reactive charge, the actuator 32 produces reaction products which cause the extendable initiator cup to extend from the first length to a longer second length. As a result, the end 46 of the retention device 30 is expelled from the opening of the actuator 32. Suitable initiator cups and associated structure are shown and described in commonly assigned U.S. Pat. No. 7,063,019. U.S. Pat. No. 7,063,019 is hereby incorporated by reference as if fully set forth herein.

The actuator 32 may be secured to the plate 28 by a clamp 47. The clamp 47 may be a metal member having first and second ends 48 secured to the plate 28 and a curved intermediate portion 50 surrounding a portion of the actuator 32. The ends 48 may be secured to the plate 28 with fasteners 52. Alternatively, the ends 48 may be welded or otherwise suitably attached to the plate 28.

As shown particularly in FIG. 1A, the system 10 may further include an electronic control unit (ECU) 56. The ECU 56 may be in communication with the airbag inflator 24 and the actuator 32 of the release mechanism 26. The ECU 56 may be responsive to input signals for activating the inflator 24 to inflate the airbag 18. Such input signals may be received from conventional crash sensors, for example. The ECU 56 may be further responsive to input signals to control the release mechanism 26 to selectively release or retain the tether 20. Such signals may include the signals received from conventional crash sensors and signals received from conventional sensors for sensing occupant size and occupant position relative to the airbag module 16, for example.

According to one particular application, the ECU 56 may employ an algorithm that uses information relating to occupant size and position to determine whether or not to allow full deployment of the airbag 18 during a vehicular crash. In the absence of appropriate control signals, the system 10 may operate to normally retain the tether 20 relative to the base 28 and thereby deploy the airbag 18 with modified deployment characteristics (e.g., reduced size and/or shape). Explaining further, the algorithm controlling the ECU 56 may control the actuator 32 to only release the tether 20 for full deployment of the airbag 18 upon sensing of predetermined conditions. Such predetermined conditions may include one or more of the following: proper position of the occupant relative to the airbag module 16 (i.e., not out-of-position relative to the airbag module 16; and greater than a predetermined size (e.g., 100 pounds or other designated weight as determined by a seat sensor).

Provided that the appropriate control signals are received by the ECU 56 from the various sensors, the system 10 may operate to activate the actuator 32. Upon actuation of the actuator 32, the end 46 of the retention device 30 is expelled from the actuator 32 and the retention device 30 is linearly translated generally in the direction of arrow C (see FIG. 3). At this intermediate point, the retention device 30 is translated such that the pin 40 is located proximate an opposite end of the elongated slot 44 and the end 46 becomes displaced from the actuator 32.

Displaced from the actuator 32, the retention device 30 is free to rotate in the direction of arrow A (see FIG. 4) about axis 38. Such rotation is initiated by a force applied in the direction of arrow D (again, see FIG. 4) by the tether 20 as a result of inflation of the airbag 18. The retention device 30 may continue to rotate to the position shown in FIG. 4, thereby freeing the looped end 34 of the tether 20 to allow full deployment of the airbag 18.

Alternatively, the system 10 may operate to normally activate the actuator 32 and thereby release the tether 20 unless signals are received indicative of an occupant situation inappropriate for full deployment of the airbag 18. Such signals may include a signal indicative of an out-of-position occupant. Such signals may also include a signal indicative of a passenger below a predetermined weight (e.g., as measured by a seat sensor).

According to another particular application, the ECU 56 may alternatively or additionally employ an algorithm that uses information relating to an actual crash or pre-crash event. In this regard, conventional vehicle sensors are operative to detect when a pre-crash event is occurring. The present teachings may be utilized to selectively deploy a common airbag in one of a pre-crash mode and a crash mode. In the pre-crash mode, the airbag may be fully deployed before the occupant is moving or before the crash event initiates. In one particular application, the fully deployed airbag may have a volume of approximately 200 to 300 liters. In the crash mode, deployment of the airbag may be restrained with one or more tethers. In the particular application described, the restrained volume of the airbag may be approximately 120 liters. It will be understood that an airbag having different fully deployed and restrained volumes may alternatively be used within the scope of the present teachings.

Figure 6:
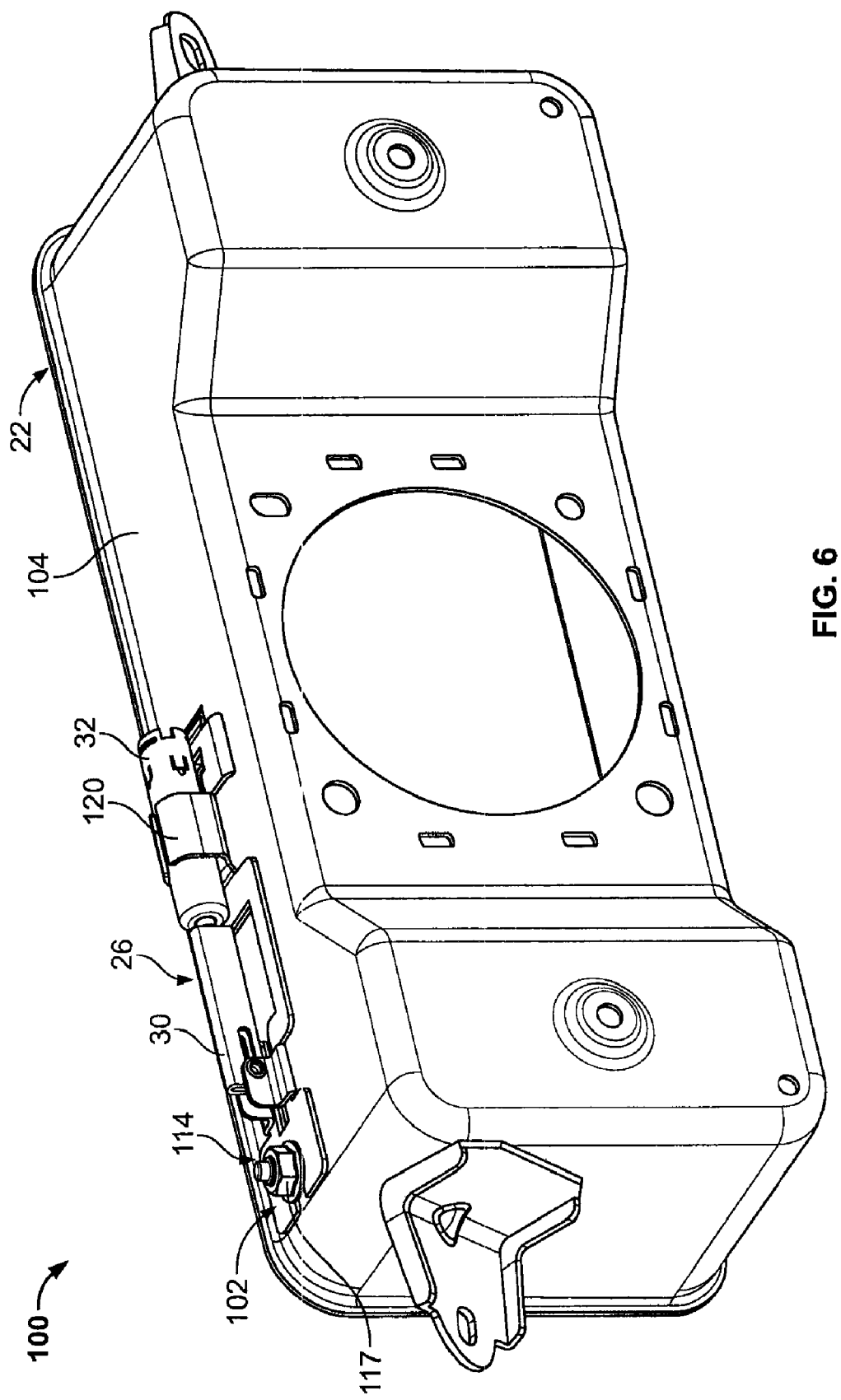
FIG. 6 is a perspective view of another airbag module in accordance with the present teachings.
Figure 7:
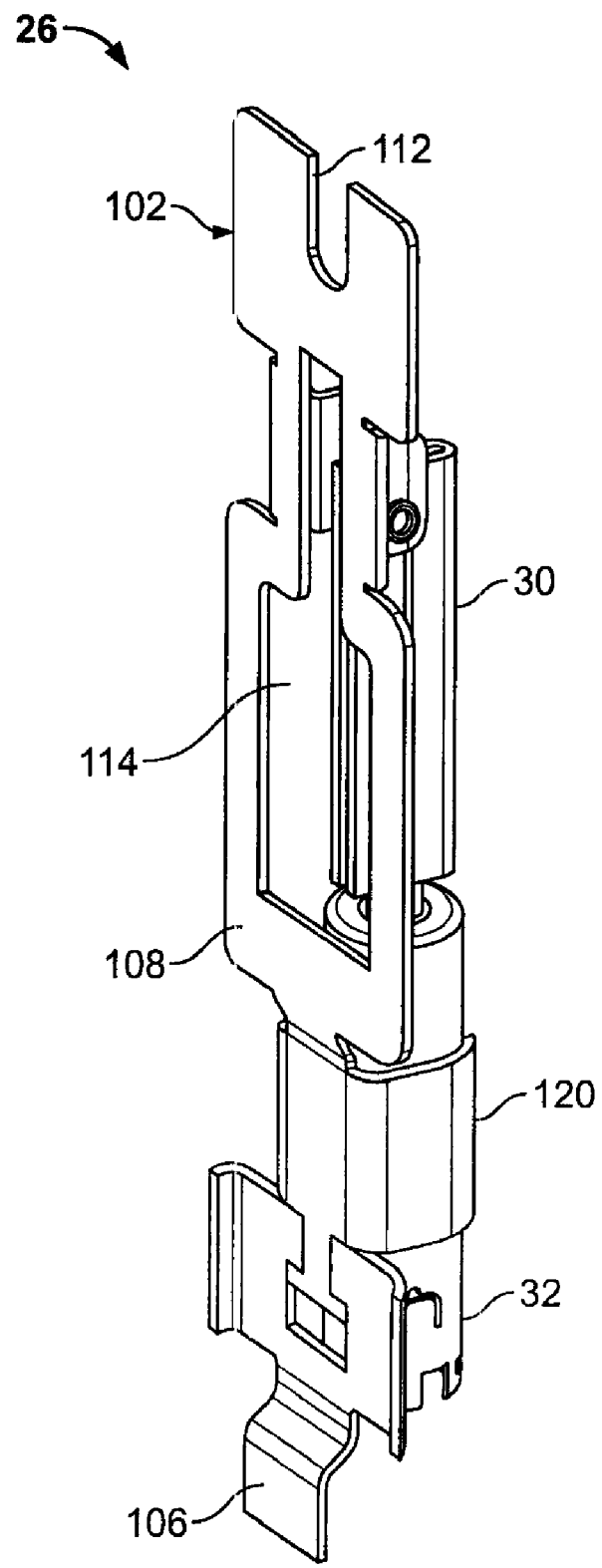
FIG. 7 is a perspective view of the tether release mechanism of FIG. 6.
Figure 8:
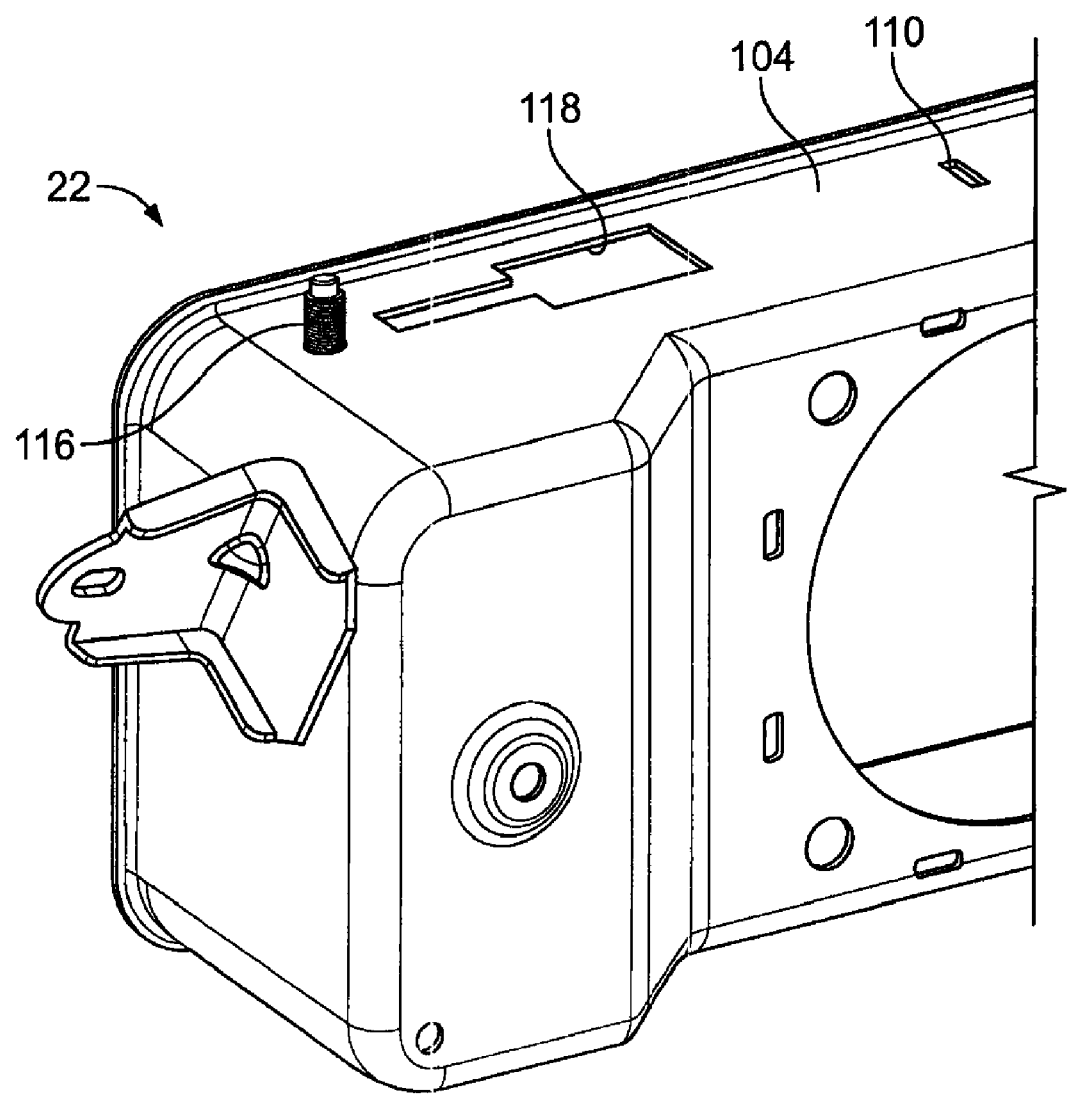
FIG. 8 is a perspective view of a portion of the airbag housing of FIG. 6.

Turning to FIGS. 6 through 8, another airbag module in accordance with the present teachings is illustrated and identified at reference character 100. The airbag module 100 shares various features in common with the airbag module 16 described above. For this reason, like reference characters have been used to identify substantially similar elements throughout the various drawings. The airbag module 100 may be utilized within an occupant restraint system in a manner substantially identical to that discussed above. It will be understood that any particular details not shown or described in connection with FIGS. 6-8 may be identical to corresponding details shown and described with respect to FIGS. 1-5.

The airbag module 100 may generally include an airbag housing and a tether release mechanism 26. The tether release mechanism 26 may generally include a base 102, a retention device 30 and an actuator 32. The base 102 may be a stamped metal plate suitably attached to the airbag housing 22. As shown in FIG. 6, for example, the base 102 may be secured to a sidewall 104 of the housing 22. The base 102 may be formed to include a tab 106 proximate one end. The tab 106 may be formed to be generally parallel to a main body portion 108 of the base 102 and may extend into a slot 110 defined by the housing 22.

An opposite end of the base 102 may define an opening 112 for cooperating with a fastener 114. The opening may be an open slot 112. The fastener may include a threaded shaft 116 upwardly extending from or passing through the sidewall 104 of the housing 22. A nut 117 may be threaded onto the shaft 116 to secure the base 102. Alternatively, the base 102 may be welded or otherwise suitably attached to the housing 22.

The main body portion 108 of the base 102 may define a window 114. The window 114 may align with a cooperating opening 118 defined by the housing 22. The tether 20 may pass through the window 114 and opening 118.

The base 102 may be integrally formed to include portions for securing the retention device 30 and the actuator 32. In this regard, the base 102 may be formed to include the pair of upwardly extending mounting portions 42 that carry the pin 40. The base 102 may be similarly formed to include a pair of securing members 120 for securing the actuator 32.

Figure 9:
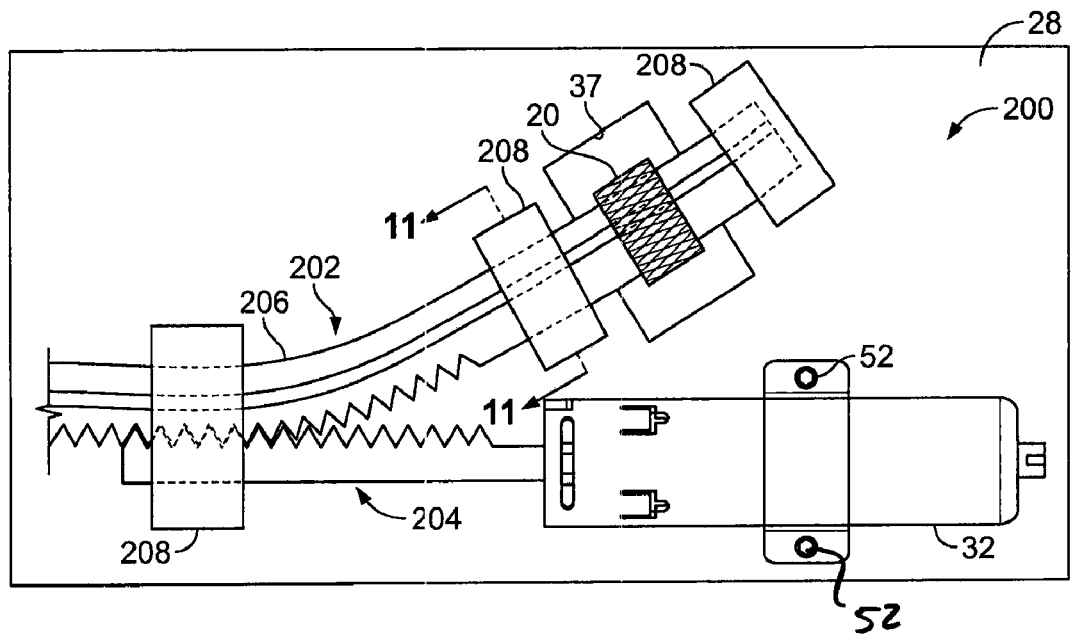
FIG. 9 is a plan view of another tether release mechanism in accordance with the present teachings, the tether release mechanism shown retaining a tether.
Figure 10:
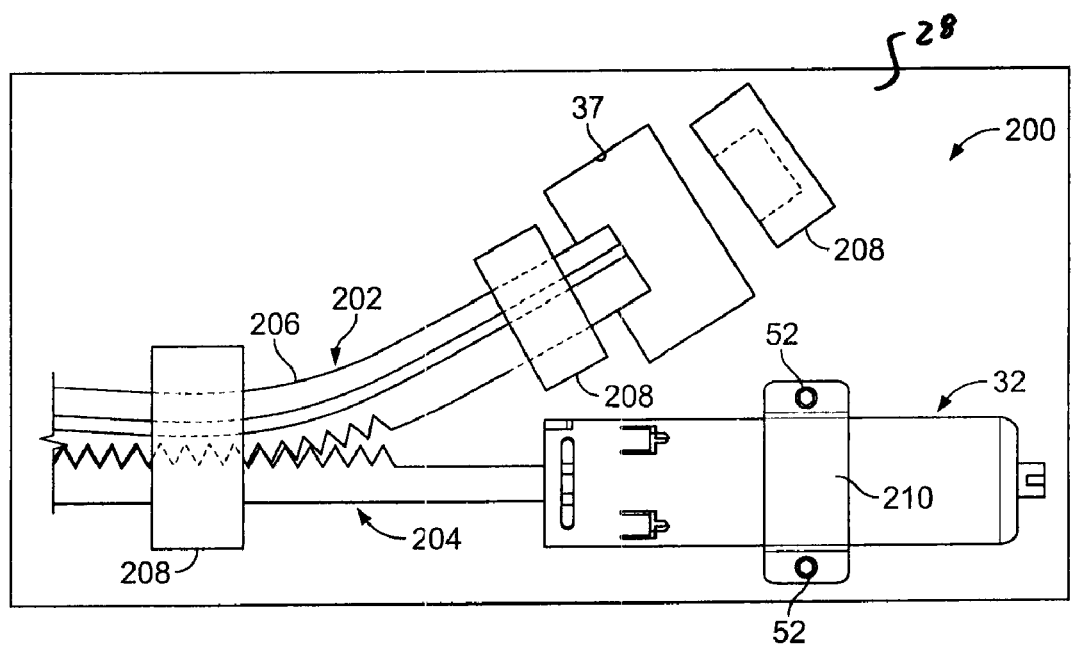
FIG. 10 is a plan view similar to FIG. 9, the tether release mechanism shown upon activation of the actuator to release the tether.
Figure 11:
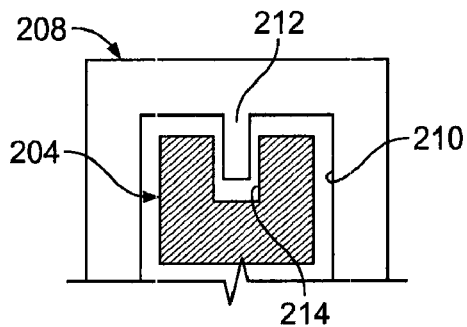
FIG. 11 is a cross-sectional view taken along the line 11-11 of FIG. 9.

Turning to FIGS. 9 through 11, another tether release mechanism in accordance with the present teachings is illustrated and identified at reference character 200. The tether release mechanism 200 shares various features in common with the tether release mechanism 26 described above. For this reason, like reference characters have been used to identify substantially similar elements throughout the various drawings.

The tether release mechanism 200 may be used with occupant restraint systems similar to those described above. The release mechanism 200 may be mounted to a plate or base 28 or alternatively mounted directly to an airbag housing 22. As shown, the release mechanism 200 may generally include a retention device 202 and an actuator 32.

The actuator 32 may include a driver in the form of a toothed rack 204. The toothed rack 204 may be formed of metal or other suitable material and may include a plurality of teeth for meshingly engaging a plurality of teeth of the retention device 202. The toothed rack 204 may be coupled to the remainder of the actuator 32 for movement between a retracted position and an extended position. The retracted position is shown in FIG. 9. The extended position is shown in FIG. 10. The actuator 32 may be secured to the base 28 with a mounting strap 210 and fasteners 52. Alternatively, the actuator 32 may be welded or otherwise secured to the base 28 in any manner well known in the art.

The retention device 202 may include a pinion 206. The pinion 206 may include the plurality of teeth that meshingly engage the rack 204. The pinion 206 may be substantially continuous curved and interconnected to the base 28 for driven motion in response to movement of the rack 204 between the retracted position and extended position.

A plurality of guide members 208 may guide the pinion 206 along its arcuate path of travel. As particularly shown in FIG. 11, the guide members 208 may define a channel 240 receiving the pinion 206. A male rail 212 may extend into a groove 214 formed in the top surface of the rack 204. One of the end guide members 208 may have a closed end. The channel 210 of the opposite end guide member 208 may be enlarged to additionally accommodate the rack 204. The guide members 208 may incorporate bearings and/or related structure for reducing friction.

The pinion 206 may pass through a loop or other retention structure of a tether 20. When the rack 204 is in the retracted position (as shown in FIG. 9), the pinion 206 may retain the tether 20 as the tether 20 extends into an opening 37. When the actuator 32 drives the rack 204 to its extended position (as shown in FIG. 10), the rack 204 in turn drives the pinion 206. This motion of the pinion 206 releases the tether 20 for full deployment of an associated airbag.

Figure 12:
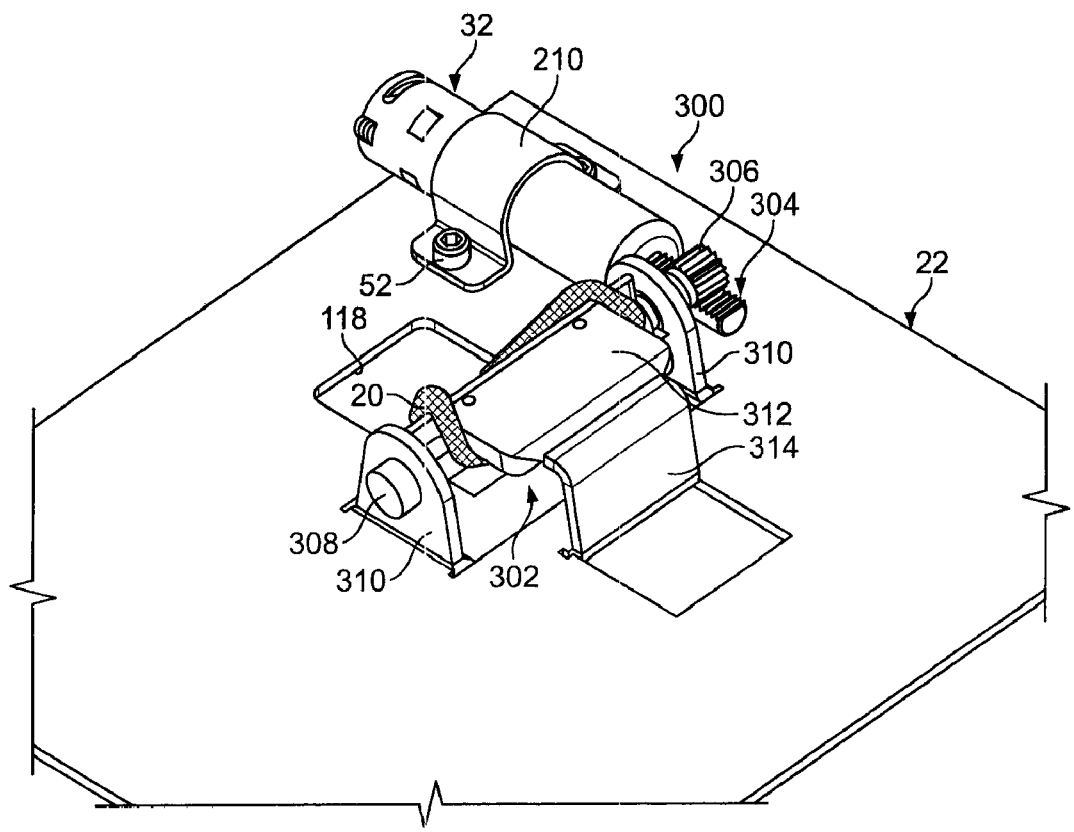
FIG. 12 is a perspective view of another tether release mechanism in accordance with the present teachings, the tether release mechanism shown retaining a tether.
Figure 13:
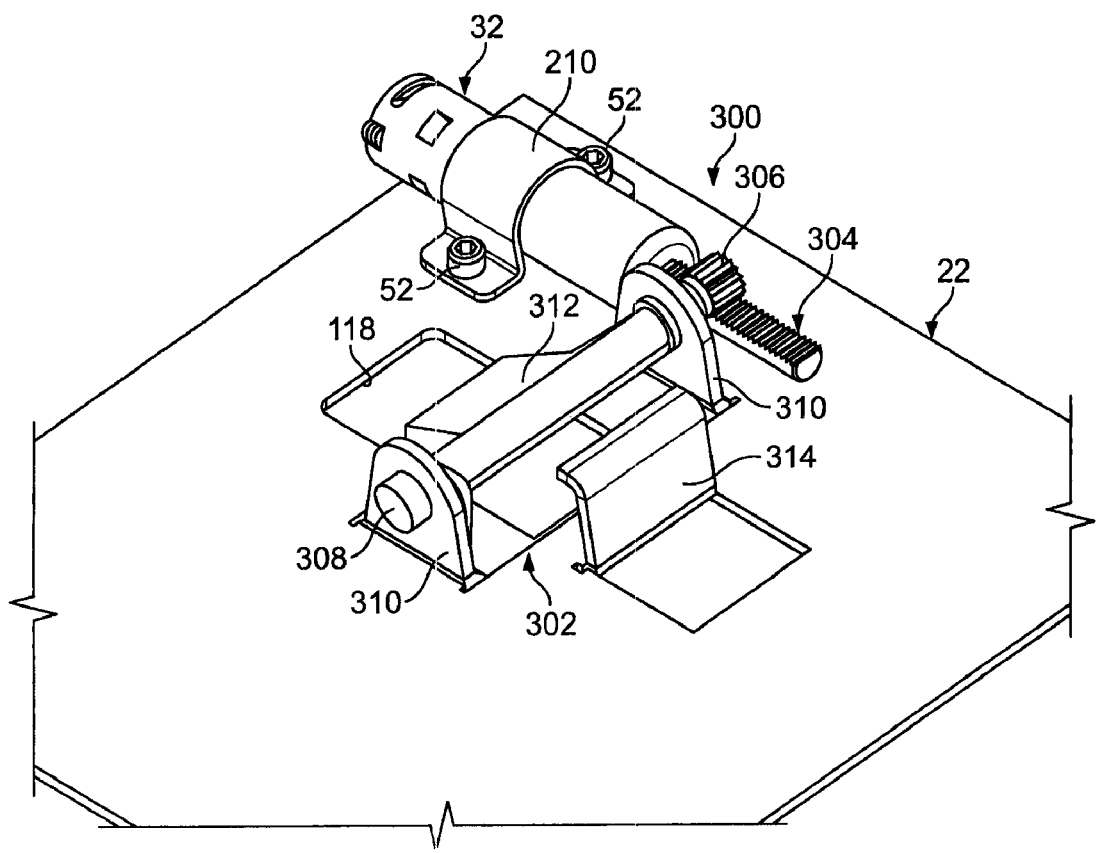
FIG. 13 is a perspective view similar to FIG. 12, the tether release mechanism shown upon activation of the actuator to release the tether.

Turning to FIGS. 12 and 13, another tether release mechanism in accordance with the present teachings is illustrated and identified at reference character 300. Again, the tether release mechanism 300 shares various features in common with the tether release mechanisms 26 and 200 described above and like reference characters have been used to identify substantially similar elements throughout the various drawings.

The tether release mechanism 300 may be used with occupant restraint systems similar to those described above. The release mechanism 300 may be mounted to a plate or base 28 or alternatively mounted directly to an airbag housing 22. As shown, the release mechanism 300 may generally include a retention device 302 and an actuator 32.

The actuator 32 may include a driver in the form of a toothed rack 304. The toothed rack 304 may be formed of metal or other suitable material and may include a plurality of teeth for meshingly engaging a plurality of teeth of the retention device 302. The toothed rack 304 may be coupled to the remainder of the actuator 32 for movement between a retracted position and an extended position. The retracted position is shown in FIG. 12. The extended position is shown in FIG. 13. The actuator 32 may be secured to the housing 22 with a mounting stamp 210 and fasteners 52. Alternatively, the actuator 32 may be welded or otherwise secured to the housing 22 in any manner well known in the art.

The retention device 302 may include a pinion gear 306. The pinion gear 306 may include the plurality of teeth that meshingly engage the rack 304. The pinion gear 306 may be formed at the end of a rotatable shaft 308 that is interconnected to the housing 22 for driven motion in response to movement of the rack 304 between the retracted position and extended position. A coil spring may be incorporated for biasing the rotatable shaft 308 to position shown in FIG. 12.

The shaft 308 may be oriented generally parallel to the rack 304 and may be rotatably supported by a pair of mounting portions 310. The pair of mounting portions 310 may be integrally formed with the housing 22. The shaft 308 may carry a retaining feature 312. The retaining feature may be in the form of a plate or arm and may be welded, secured with fasteners or otherwise secured to the shaft 308 in a conventional manner.

When the rack 304 is in its retracted position, the retaining feature 312 may be oriented generally parallel to the housing 22 (as shown in FIG. 12). A loop or other feature of the tether 20 may be secured by the retaining feature 312. A stop member 314 may be positioned proximate the retaining feature 312 to prevent inadvertent release of the tether 20. The stop member 314 may extend upwardly from the housing 22 and may be integrally formed with the housing 22.

When the rack 304 is in the retracted position (as shown in FIG. 12), the retaining feature 312 may retain the tether 20 as the tether 20 extends into an opening 118 of the housing 22. When the actuator 32 drives the rack 304 to its extended position (as shown in FIG. 12), the rack 304 in turn drives the pinion gear 306. This motion of the pinion gear 306 releases the tether 20 for full deployment of an associated airbag 18. The retaining feature 312 may rotate at least through approximately 180° as the rack 304 moves from its retracted position to its extended position. In one application, the retaining feature 312 may rotate through approximately 220° as the rack moves from its retracted position to its extended position.

As heretofore described, the various embodiments of the teachings of the present invention employs a pyrotechnic type device for driving an element to release an airbag tether. It is anticipated that other forms of actuation may be employed within the scope of the present teachings. For example, exit gases of an airbag inflator may be employed for actuating the release of the tether 20. In this regard, the present teachings may be readily adapted to incorporate a scoop or inlet proximate the gas exit orifice of an inflator device for purposes of driving a pinion or other mechanism. In such an example, the present teachings may be advantageously incorporated into an occupant restraint system operative in a pre-crash mode and a crash mode without the need for an additional pyrotechnic pusher, wire harness, supporting electronics, etc., to increase an airbag's volume for a pre-crash event.

While specific examples have been described in the specification and illustrated in the drawings, it will be understood by those skilled in the art that various changes may, be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within this foregoing description and any appended claims.

What is claimed is:

1. A release mechanism for a restraining element of an occupant restraint system, the release mechanism comprising:
   a base;
   a retention device coupled to the base for movement between a locked position and a release position such that the restraining element is secured relative to the base in the locked position and is movable relative to the base in the release position, the retention device including a retaining portion for releasably engaging the restraining element and a pin, the retaining portion translating relative to and pivoting about the pin when moved between the locked position and the release position; and
   an actuator operatively associated with the retention device, the actuator operative for at least initiating movement of the retention device from the locked position to the release position.

2. The release mechanism of claim 1, wherein the pin is fixed for movement with the base.

3. The release mechanism of claim 1, wherein the retaining portion includes a first portion in contact with the restraining element in the locked position and a second portion.

4. The release mechanism of claim 3, wherein the second portion is at least partially disposed within a housing of the actuator in the locked position.

5. The release mechanism of claim 3, wherein the second portion includes a smaller diameter than the first portion.

6. The release mechanism of claim 1, wherein the pin is slidably received within an elongated slot of the retaining portion.

7. The release mechanism of claim 1, wherein the actuator includes a pyrotechnic device.

8. The release mechanism of claim 1, wherein the actuator automatically initiates movement of the retention device from the locked position to the release position upon a predetermined condition.

9. The release mechanism of claim 1, wherein the restraining element includes a loop and the retaining portion of the retention device passes through the loop.

10. A release mechanism for a tether of an inflatable restraint device, the tether defining a loop, the tether release mechanism comprising:
a base;
a retention device coupled to the base for movement between a locked position and a release position such that the tether is secured relative to the base in the locked position and is movable relative to the base in the release position, the retention device including a retaining portion for at least partially passing through a loop of the tether and a first toothed portion disposed adjacent to the retaining portion; and
an actuator including a second toothed portion in meshed engagement with the first toothed portion to selectively initiate movement of the retention device from the locked position to the release position.

11. The release mechanism of claim 10, wherein the actuator is a pyrotechnic device.

12. The release mechanism of claim 10, wherein the second toothed portion translates along a first axis.

13. The release mechanism of claim 12, wherein the first toothed portion rotates about a second axis in response to translation of the second toothed portion along the first axis.

14. The release mechanism of claim 12, wherein the first toothed portion moves at least partially along the first axis in response to translation of the second toothed portion along the first axis.

15. An airbag module comprising:
an airbag;
a tether associated with the airbag, the tether being selectively operable to modify a deployment characteristic of the airbag; and
a release mechanism for selectively releasing the tether, the release mechanism including a base, a retention device and an actuator, the retention device coupled to base for movement between a locked position and a release position such that the tether is secured relative to the base in the locked position and is movable relative to the base in the release position, the retention device including a retaining portion for releasable engaging the tether and a pin, the retaining portion translating relative to and pivoting about the pin when moved between the locked position and the release position, the actuator operatively associated with the retention devices and operative for at least initiating movement of the retention device from the locked position to the release position.

16. The airbag module of claim 15, wherein the tether defines a loop and wherein the retaining portion of the retention device at least partially extends through the loop.

17. The airbag module of claim 15, wherein the pin is fixed for movement with the base.

18. The airbag module of claim 15, wherein the pin is slidably received within an elongated slot of the retaining portion.

19. The airbag module of claim 15, wherein the retaining portion includes a first portion in contact with the restraining element in the locked position and a second portion.

20. The airbag module of claim 19, wherein the second portion is at least partially disposed within a housing of the actuator in the locked position.

21. The airbag module of claim 19, wherein the second portion includes a smaller diameter than the first portion.

22. The airbag module of claim 15, wherein the actuator includes a pyrotechnic device.

* * * * *